July 22, 1958     W. C. BUTEHORN     2,843,963
MECHANICAL FINGER FOR SPINNING REEL IN FISHING TACKLE Filed May 21, 1957

INVENTOR.
WILLIAM C. BUTEHORN
BY
Carl Miller
ATTORNEY

United States Patent Office 2,843,963
Patented July 22, 1958

2,843,963

MECHANICAL FINGER FOR SPINNING REEL IN FISHING TACKLE

William C. Butehorn, Staten Island, N. Y.

Application May 21, 1957, Serial No. 660,560

4 Claims. (Cl. 43—25)

This invention relates to fishing tackle and more particularly to a mechanical finger for controlling the line of spinning type fishing reels.

Ordinarily, when casting heavy lures in the conventional manner, the line is held with the tip of the index finger, thereby putting a severe strain on the finger and preventing the caster from putting his maximum power into the cast, losing distance, and irritating the finger. Accordingly, an object of the present invention is to provide a mechanical finger for holding the line as the lure is cast so as to overcome the aforementioned difficulties.

Another object of the present invention is to provide a manually actuated release mechanism for permitting the line to disengage the mechanical finger during the casting of the lure without the necessity of having to directly hold the line with the hand.

A further object of the present invention is to provide a mechanical finger for positively holding the line as it is being cast so as to prevent slipping and pulling of the drag or the sinking of the line into the windings on the reel.

All of the foregoing and still further objects and advantages of this invention will become apparent from a study of the following specification, taken in connection with the accompanying drawing, wherein.

Figure 1:
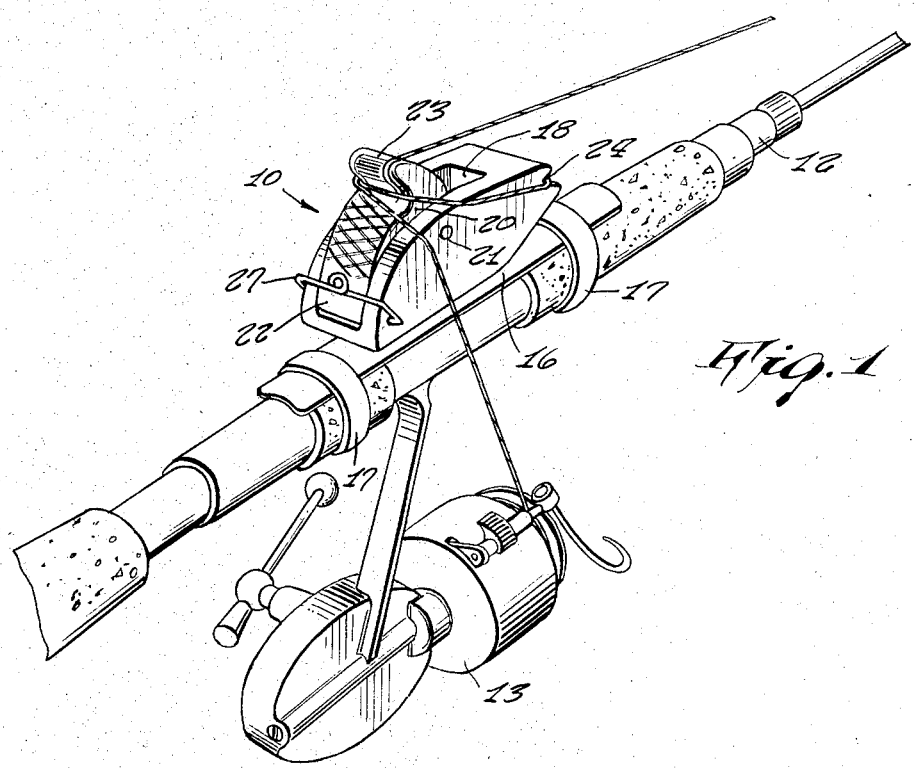
Figure 1 is a perspective view of a mechanical finger made in accordance with the present invention in operative use on a spinning reel type fising tackle.

Referring now to the drawing, and more particularly to Figure 1 thereof, a mechanical finger assembly 10 made in accordance with the present invention is shown in operative association secured upon a fishing pole 12 in connection with a spinning reel 13. This device 10 includes an arcuate base plate 16 that is secured to the housing 15 of the device 10 such as by screws 14. This base plate is secured to the fishing pole 12 in a manner similar to that used in connection with the securement of fishing reels thereto, through the use of longitudinally slidable seat rings 17 that overlie the ends of the base plate 16.

The housing 15 defines a central enlarged recess 18 within which a latch 20 is rotatably supported upon a centrally located hinge pin 21. This latch member 20 includes a trigger or thumb plate 22 at the rear end and a mechanical finger 23 at the forward end. The forward end of the housing 15 is also provided with an indent 24 in the form of a recess that cooperates with the upwardly extending finger 23 in a manner hereinafter described. A plurality of transversely extending ridges in the trigger portion 22 are adapted to releasably receive the base portion of a U-shaped bail 27 that is pivotally supported upon the rear end of the housing 15.

Figure 2:
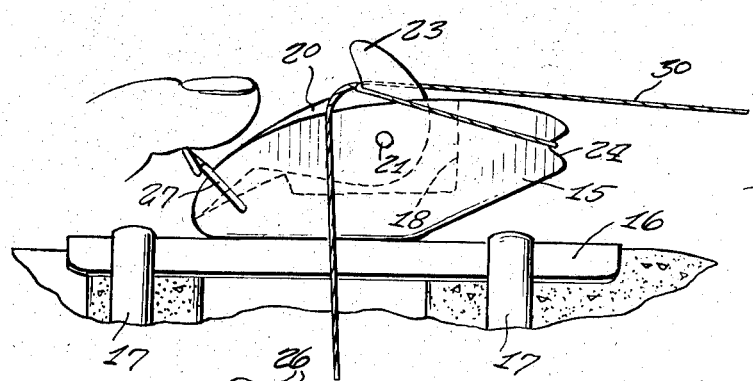
Figure 2 is a side elevational view of the device shown in Figure 1.
Figure 3:
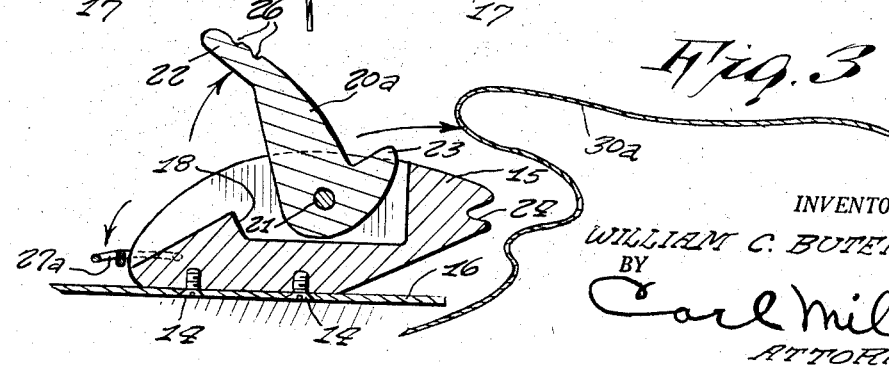
Figure 3 is a longitudinal cross sectional view of the device shown in Figure 2, in a released position.

In arranging the tackle for casting, the latch member 20 is rotated to the normally horizontal position shown in Figures 1 and 2 and the bail 27 rotated upwardly into engagement with one of the ridges 26 on the thumb plate 22 so as to secure the latch 20 in that position. The fishing line 30 is then drawn upwardly from the reel 13 around the rear of mechanical finger 23 on the latch 20, forwardly around the housing and into the indent 24 at the forward end of the housing, and then rearwardly back and around the mechanical finger 23 so as to extend forwardly toward the front end of the pole. It will thus be recognized that any forward pull on the line 30 only tightens the engagement of the line with the respective recess and indent so that no pull is exerted upon the drag or upon the line on the reel 13. Prior to swinging the pole rearwardly to the casting position, the bail 27 is rotated downwardly so as to disengage the finger plate 22, whereupon the caster's thumb is used to maintain the latch plate in the position shown in Figures 1 and 2. The cast is then made in the same manner as with a conventional surf reel during which cast, the thumb is lifted at the proper time from the thumb plate 22 to permit the latch member 20 to rotate to the release position 20a, as shown in Figure 3, in which position the mechanical finger 23 is disposed to fall open forwardly to permit the line 30a to disengage from the mechanical finger 23 and the indent 24 of the housing, whereupon the lure draws the line outwardly from the reel in a conventional manner. It will be noted that the downwardly depressed bail 27a does not interfere with this movement of the latch member 20. The device can be reset in the aforementioned manner to ready the tackle for the next cast.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A mechanical finger for spinning type apparatus comprising, in combination, a housing, a latch pivotally supported within said housing, securement means associated with said latch and said housing for securing a fishing line against movement relative thereto, and manually operated means associated with said latch and said housing for selectively releasing said line from said securement means, said latch including an upwardly disposed extension, said securement means comprising an indent in the forward end of said housing, said line in said secured position extending into said indent and around said forward end of said housing and around the rear side of said extension, said latch further comprising a thumb plate, and said manually operated means comprising a bail pivotally carried by said housing for rotation toward an engaged position with said thumb plate to secure said latch in a normal position with the rear side of said mechanical finger facing away from said forward end of said housing.

2. A mechanical finger as set forth in claim 4, wherein said indent comprises a groove in the forward end of said housing, said groove being substantially parallel to the pivotal axis of rotation of said bail.

3. A mechanical finger as set forth in claim 2, wherein said bail is supported adjacent to the rear extremity of said housing, and said extension is disposed intermediate said bail and said indent.

4. A mechanical finger as set forth in claim 1, wherein release of said bail is operative to effect rotation of said latch toward said forward end of said housing wherein said latch opens toward said forward end to release said line.

References Cited in the file of this patent

UNITED STATES PATENTS 2,791,858    Kernodle _____ May 14, 1957
2,804,711    Kozar _____ Sept. 3, 1957